(12) United States Patent
Mizumaki (10) Patent No.: US 7,321,294 B2
(45) Date of Patent: Jan. 22, 2008

(54) DISPLAY DEVICE, INSTRUMENT PANEL, AUTOMOTIVE VEHICLE AND METHOD FOR CONTROLLING INSTRUMENT PANEL

(75) Inventor: Hidetaka Mizumaki, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 174 days.

(21) Appl. No.: 11/109,931

(22) Filed: Apr. 19, 2005

(65) Prior Publication Data

US 2005/0237171 A1  Oct. 27, 2005

(30) Foreign Application Priority Data

Apr. 21, 2004 (JP) ............... 2004-125455
Feb. 16, 2005 (JP) ............... 2005-039434

(51) Int. Cl.
*B60Q 1/00* (2006.01)
*G09F 9/00* (2006.01)
*G09G 3/30* (2006.01)

(52) U.S. Cl. ............ 340/438; 340/461; 340/462; 340/693.1; 340/693.6; 340/525; 340/691.1; 340/995.27; 345/77; 345/88

(58) Field of Classification Search ........... 340/438, 340/461, 462, 691.3, 691.6, 441
See application file for complete search history.

(56) References Cited

U.S. PATENT DOCUMENTS

| | | | |
|---|---|---|---|
| 4,965,574 A * | 10/1990 | Fukushima et al. | 340/995.27 |
| 5,293,154 A * | 3/1994 | Ginzel et al. | 340/438 |
| 5,764,139 A | 6/1998 | Nojima et al. | |
| 5,815,072 A * | 9/1998 | Yamanaka et al. | 340/461 |
| 5,975,728 A | 11/1999 | Weyer | |
| 5,995,012 A * | 11/1999 | Lee et al. | 340/815.45 |
| 6,294,990 B1 * | 9/2001 | Knoll et al. | 340/461 |
| 6,583,569 B1 | 6/2003 | Wang | |
| 6,693,523 B1 * | 2/2004 | Abel et al. | 340/461 |
| 6,937,224 B1 | 8/2005 | Miyachi | |
| 2001/0040534 A1 | 11/2001 | Ohkawara et al. | |
| 2004/0059472 A1 | 3/2004 | Hedrick | |

FOREIGN PATENT DOCUMENTS

| | | |
|---|---|---|
| CN | 2313776 | 4/1990 |
| CN | 2349059 | 11/1999 |
| DE | 199 14 597 A1 | 10/2000 |
| DE | 100 21 101 A1 | 11/2001 |
| JP | 58-13486 | 8/1983 |
| JP | 58-134686 | 8/1983 |

(Continued)

OTHER PUBLICATIONS

Official Communication issued in the corresponding European Application No. 05252462.6-2422, dated Mar. 1, 2006.

(Continued)

*Primary Examiner*—Donnie L. Crosland
(74) *Attorney, Agent, or Firm*—Keating & Bennett, LLP (57) ABSTRACT

A display device for use in an instrument panel to be mounted in an automotive vehicle is capable of displaying information concerning the status of the automotive vehicle. The display device is further capable of providing an alarm, when a predetermined physical parameter among physical parameters representing the status of an automotive vehicle is within a predetermined range, by effecting at least one of a change in display luminance and a change in displayed color.

19 Claims, 7 Drawing Sheets

FOREIGN PATENT DOCUMENTS

| | | |
|---|---|---|
| JP | 06-344840 | 12/1994 |
| JP | 2000-047619 | 2/2000 |
| JP | 2001-060078 | 3/2001 |
| JP | 2001-296838 | 10/2001 |

OTHER PUBLICATIONS

Official communication issued in the corresponding Chinese Patent Application No. 2005100661683, mailed on Nov. 3, 2006.

* cited by examiner

FIELD OF VIEW WHEN CHECKING OUTSIDE OF VEHICLE

DISPLAY DEVICE, INSTRUMENT PANEL, AUTOMOTIVE VEHICLE AND METHOD FOR CONTROLLING INSTRUMENT PANEL

BACKGROUND OF THE INVENTION

1. Field of the Invention

The present invention relates to a display device, and more particularly to a display device for an instrument panel to be mounted in an automotive vehicle. The present invention also relates to an instrument panel, a method for controlling the instrument panel, and an automotive vehicle including the instrument panel.

2. Description of the Related Art

An automotive vehicle includes a so-called instrument panel. The instrument panel displays information which is necessary for driving the automotive vehicle, e.g., velocity. Since the driver will be driving while taking into account constantly-changing information which is displayed on the instrument panel, it is preferable that the instrument panel be capable of performing display so as to enable good visual recognition.

As a technique for performing display with good visual recognition, Japanese Laid-Open Patent Publication No. 2000-47619 discloses a technique of performing three-dimensional display by using a pair of parabolic mirrors.

Figure 10:
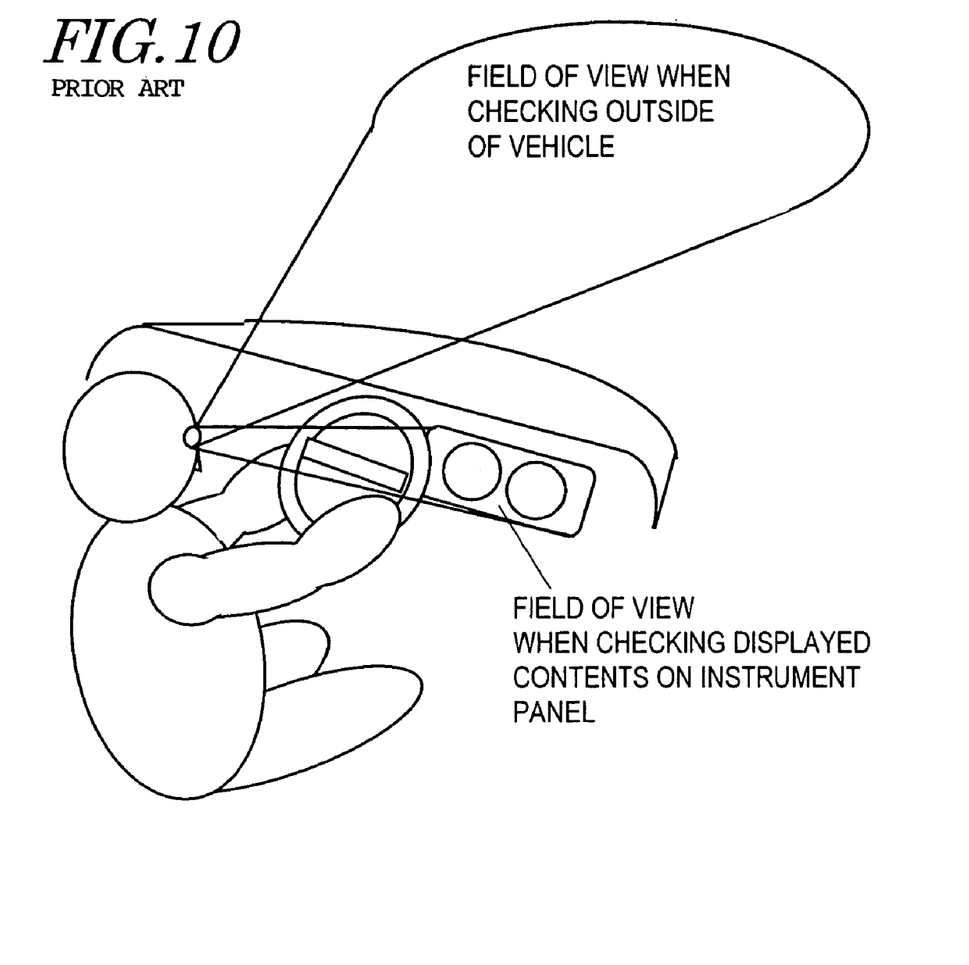
FIG. 10 is a diagram for explaining a problem of conventional instrument panels.

However, as shown in FIG. 10, the driver's field of view while he or she is checking the outside of the vehicle is different from the driver's field of view while he or she is checking the displayed content on the instrument panel. Therefore, the driver is compelled to look toward the outside of the vehicle or look at the instrument panel in an alternating manner. As a result, there is a problem in that, while the driver is looking at the instrument panel, not enough attention is being paid to the outside of the vehicle. This problem still exists even when an improvement in visual recognition is obtained by using the technique disclosed in Japanese Laid-Open Patent Publication No. 2000-47619.

For the above-described reason, a driver tends to refrain from looking at the displayed content on the instrument panel while driving a vehicle. Although the instrument panel is often provided with indicators for giving alarm indications concerning remaining fuel amount, oil leakage, etc., the driver is not likely to view the displayed content on the instrument panel very frequently, so that it is difficult to quickly convey to the driver any information for which an alarm needs to be given. In particular, it is often difficult to give an effective alarm concerning any physical parameter which varies over short periods of time, such as vehicle velocity. This problem is not solved by the technique described in Japanese Laid-Open Patent Publication No. 2000-47619.

SUMMARY OF THE INVENTION

In order to overcome the problems described above, preferred embodiments of the present invention provide a display device which is suitably used for an instrument panel to be mounted in an automotive vehicle, an instrument panel incorporating such a display device, and a method for controlling the instrument panel, and an automotive vehicle including such an instrument panel.

The present invention is directed to a display device for an instrument panel to be mounted in an automotive vehicle, the display device being capable of displaying information concerning a status of the automotive vehicle, and, when a predetermined physical parameter among at least one physical parameter representing the status of the automotive vehicle is within a predetermined range, providing an alarm by effecting at least one of a change in display luminance and a change in displayed color.

In a preferred embodiment, the predetermined physical parameter is a velocity of the automotive vehicle, a revolution of an engine, a remaining fuel amount, a remaining battery power, a water temperature, or a vehicular gap. However, other physical parameters or characteristics relating to the automotive vehicle may be the subject of the alarm.

In a preferred embodiment, the change in display luminance is effected so that a display luminance when the predetermined physical parameter is within the predetermined range is at least temporarily higher than a display luminance when the predetermined physical parameter is outside the predetermined range.

In a preferred embodiment, the change in display luminance is effected intermittently when the predetermined physical parameter is within the predetermined range.

In a preferred embodiment, the change in display luminance is effected such that black is intermittently displayed when the predetermined physical parameter is within the predetermined range.

In a preferred embodiment, the change in display luminance or change in displayed color is such that the amount of increase in luminance or the particular color displayed is an indication of the seriousness of the condition for which the alarm is being given.

In a preferred embodiment, the rate of intermittent change in luminance or intermittent display of the color black is an indication of the seriousness of the condition for which the alarm is being given.

In a preferred embodiment, the change in display luminance and/or the change in displayed color is effected in a portion of a displaying region.

In a preferred embodiment, the change in display luminance and/or the change in displayed color is effected in the entirety of a displaying region.

In a preferred embodiment, the change in display luminance and/or the change in displayed color is effected in a portion of a displaying region where the predetermined physical parameter is displayed.

In a preferred embodiment, the change in display luminance and/or the change in displayed color is effected also in another portion of a displaying region where the predetermined physical parameter is not displayed.

In a preferred embodiment, the predetermined physical parameter is a physical parameter which is not displayed in a displaying region.

In a preferred embodiment, the display device of the present invention is preferably a liquid crystal display device including a liquid crystal panel having a pair of substrates and a liquid crystal layer provided between the pair of substrates.

In a preferred embodiment, the display device of the present invention also includes an illuminator provided at a back side of the liquid crystal panel, the display device being capable of effecting the change in display luminance by changing a luminance of the illuminator.

In a preferred embodiment, the display device of the present invention further includes a driving circuit arranged to supply a signal for driving the liquid crystal panel, the display device being capable of effecting the change in display luminance or the change in displayed color by varying a signal supplied from the driving circuit.

In a preferred embodiment, the display device of the present invention further includes a driving circuit arranged to supply a signal for driving the liquid crystal panel having a plurality of pixels, wherein the driving circuit is capable of supplying within one vertical scanning period a black display signal corresponding to a black display state to each pixel of the liquid crystal panel, the black display signal being supplied with a timing different from a timing for supplying a data signal, so that each pixel of the liquid crystal panel retains the data signal for a predetermined first period, and retains the black display signal for a predetermined second period, the first and second periods belonging to one vertical scanning period.

In a preferred embodiment, the display device of the present invention is capable of effecting the change in display luminance by varying a ratio between the first period of retaining the data signal and the second period of retaining the black display signal.

The present invention is also directed to an instrument panel including any of the aforementioned display devices.

The present invention is also directed to an automotive vehicle including the aforementioned instrument panel.

The present invention is also directed to a method for controlling an instrument panel to be mounted in an automotive vehicle, the instrumental panel including a display device capable of displaying information concerning a status of the automotive vehicle, the method including the steps of determining whether a predetermined physical parameter among at least one physical parameter representing the status of the automotive vehicle is within a predetermined range, and when it is determined in the determination step that the predetermined physical parameter is within the predetermined range, causing the display device to give an alarm by effecting at least one of a change in display luminance and a change in displayed color.

The display device of various preferred embodiments of the present invention is capable of, when a predetermined physical parameter among at least one physical parameter representing the status of an automotive vehicle is within a predetermined range, giving an alarm by effecting at least one of a change in display luminance and a change in displayed color. This allows the driver to recognize that the automotive vehicle is in a condition which needs particular attention, even while the driver is looking toward the outside of the vehicle. As a result, safer driving is possible.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Hereinafter, preferred embodiments of the present invention will be described with reference to the accompanying drawings. It is to be understood that the scope of the present invention is not to be limited to the below-described preferred embodiments.

Figure 1A:
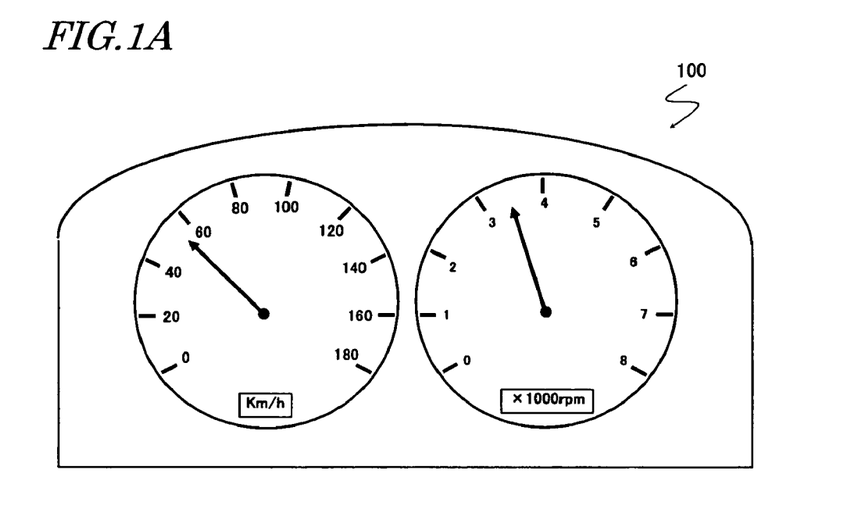
FIGS. 1A and 1B are, respectively, a front elevational view and a cross-sectional view schematically showing a display device 100 according to a preferred embodiment of the present invention.
Figure 1B:
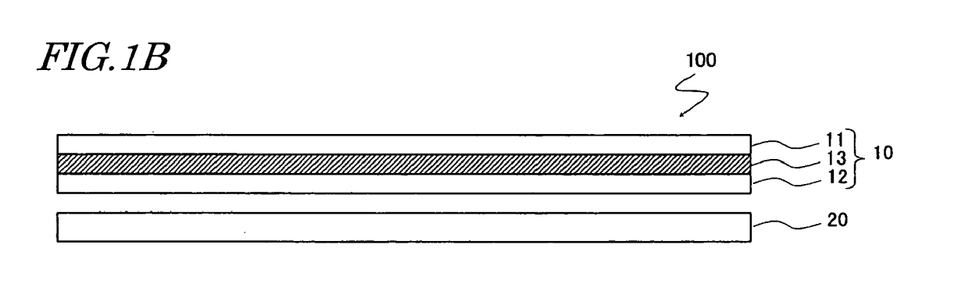

Referring to FIGS. 1A and 1B, a display device 100 according to the present preferred embodiment of the invention will be described. FIGS. 1A and 1B are, respectively, a front elevational view and a cross-sectional view schematically showing the display device 100.

The display device 100 is preferably a display device for an instrument panel to be mounted in an automotive vehicle, and is capable of displaying information concerning the status of the automotive vehicle. Although FIG. 1A illustrates an example where the velocity of the vehicle and the revolution of the engine are being displayed, it will be appreciated that the information to be displayed is not limited thereto. Alternatively, remaining fuel amount, water temperature, remaining battery power, and/or shift lever position, and any other information may be displayed. Although FIG. 1A illustrates a displayed image resembling analog meters each having a dial and a needle, the displayed image may alternatively be in the form of a digital meter(s) on which changing numerical figures are shown with time.

As shown in FIG. 1B, the display panel 100 of the present preferred embodiment is preferably a liquid crystal display device including a liquid crystal display panel 10 having a pair of substrates (e.g., glass substrates) 11 and 12 and a liquid crystal layer 13 interposed therebetween, and an illuminator (backlight) 20 provided at the back side of the liquid crystal panel 10. Although not shown in FIG. 1B, on the surface of the substrate(s) 11 and/or 12 facing the liquid crystal layer 13, a pair of electrodes for applying a voltage to the liquid crystal layer 13 are provided. On the surfaces of the substrates 11 and 12 opposite from the liquid crystal layer 13, a pair of polarizers are typically provided.

The display device 100 of a preferred embodiment of the present invention is capable of giving a visual alarm when a predetermined physical parameter among a number of physical parameters representing the status of an automotive vehicle is within a predetermined range.

Specific examples of physical parameters representing the status of an automotive vehicle include vehicle velocity, revolution of the motive power generator (e.g., a gasoline engine or an electric motor, hereinafter collectively referred to as a "motor"), remaining fuel amount, remaining battery power, water temperature, vehicular gap, and so on. However, the present invention is in no way limited to the aforementioned parameters or characteristics of the vehicle for which an alarm may be provided. The display device 100 is capable of providing an alarm when a predetermined one among such physical parameters is within a predetermined range (hereinafter also referred to as an "alarm range"). For example, the display device 100 may provide an alarm under the following conditions: when the vehicle velocity has exceeded a certain velocity; when the motor revolution has exceeded a certain revolution; when the remaining fuel amount or remaining battery power has become lower than a certain amount; when the water temperature has exceeded a certain temperature; or when the vehicular gap has become less than a certain distance. In the case where an alarm concerning vehicular gap is to be provided, an alarm range may be set with respect to the vehicular gap between the vehicle which is being driven by the driver and a preceding vehicle, in accordance with the vehicle velocity. For example, an alarm may be set to go off when the vehicular gap has become equal to or less than a stopping distance (=thinking distance+braking distance), given a thinking time of about two seconds, for example. Detection of the vehicular gap can be performed by an infrared radar or the like.

Figure 2:
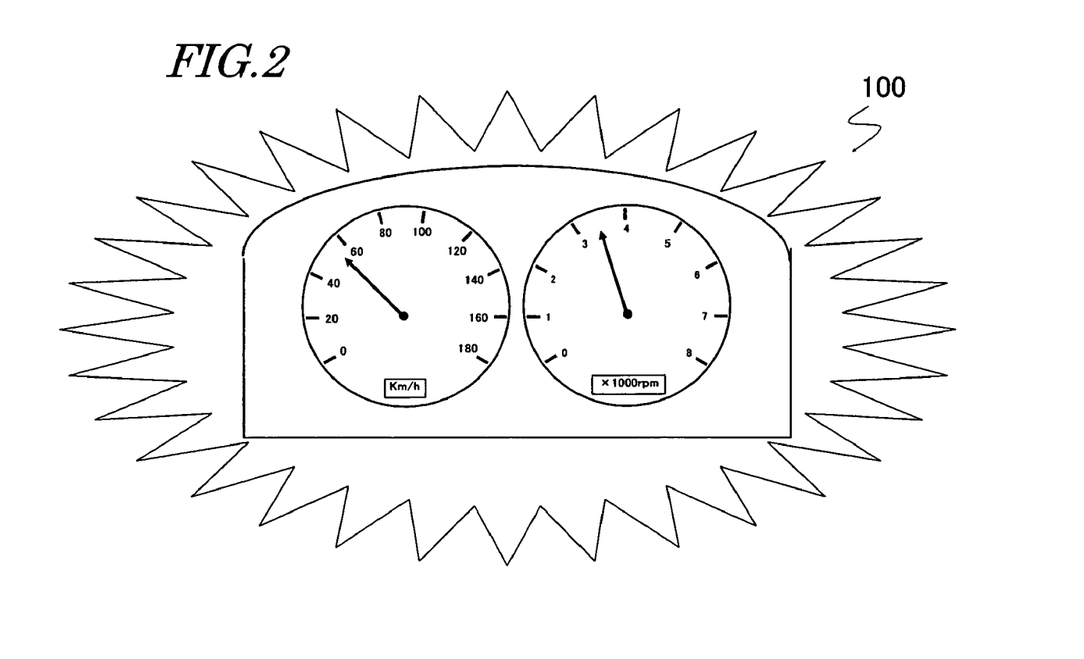
FIG. 2 is a schematic illustration of the display device 100 of a preferred embodiment of the present invention while giving an alarm.

Specifically, the aforementioned alarm is provided by effecting at least one of a change in display luminance and a change in displayed color. FIG. 2 schematically illustrates the display device 100 providing an alarm by effecting a change in display luminance. FIG. 2 illustrates an example where the display luminance is made higher when a predetermined physical parameter is within an alarm range than when the physical parameter falls outside the alarm range. Alternatively, a flashing of display luminance may be performed as described later.

Figure 3:
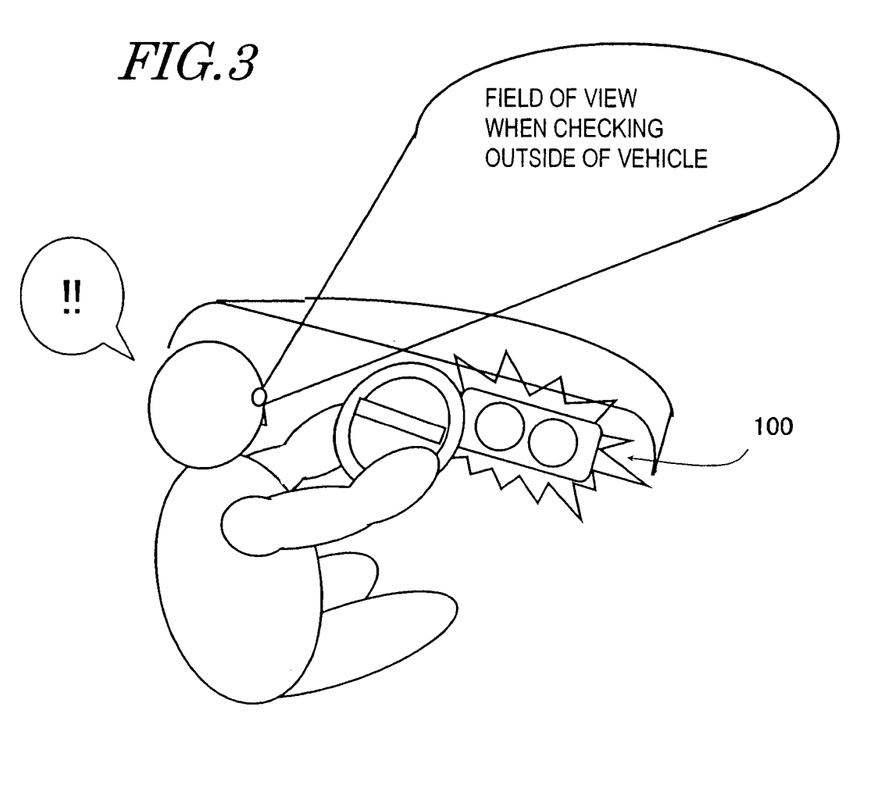
FIG. 3 is a diagram for explaining the effects of various preferred embodiments of the present invention.

The display device 100 according to a preferred embodiment of the present invention provides an alarm by effecting at least one of a change in display luminance and a change in displayed color. Therefore, as schematically shown in FIG. 3, the driver can recognize that the automotive vehicle is in a condition which needs particular attention, even while looking toward the outside of the vehicle. This makes for safer driving.

In order to enhance the alarming effect, a sound-based alarm (alarm sound) may concurrently be used. Note that an alarm sound, when used alone, might be difficult to be recognized depending on the ambient volume level (e.g., when a car audio system is playing at a high sound volume level). On the other hand, the display device 100 according to a preferred embodiment of the present invention at least provides a visual alarm, which allows the driver to recognize the alarm with an increased certainty.

Figure 4:
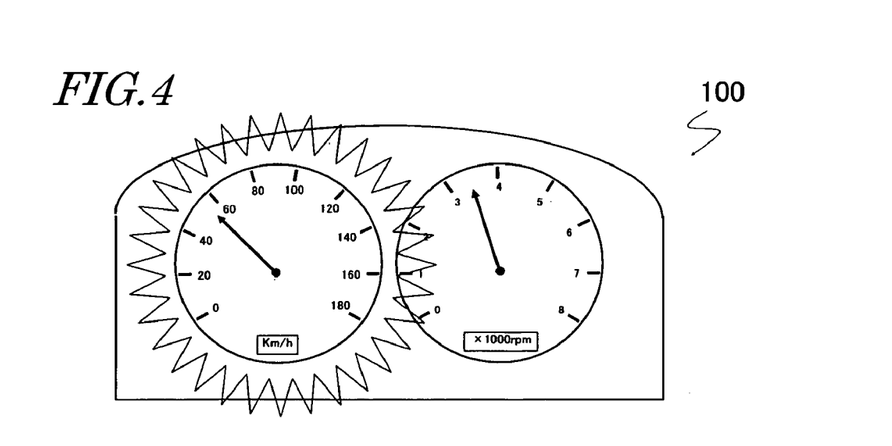
FIG. 4 is a schematic illustration of the display device 100 of a preferred embodiment of the present invention while giving an alarm.

FIG. 2 illustrates an example where the luminance of the entire displaying region of the display device 100 is being enhanced. Alternatively, as shown in FIG. 4, the luminance of only a portion of the displaying region (which may be, in the case of an alarm concerning velocity, a portion that is displaying velocity) may be enhanced.

Moreover, the display luminance may be enhanced for the entire duration for which the predetermined physical parameter stays within the alarm range, or a higher luminance and a usual luminance may be periodically switched. Furthermore, the period with which the higher luminance displaying and the usual luminance displaying are switched may be varied in accordance with the degree of alarming (e.g., in accordance with the excess of velocity). For example, a more serious condition may be indicated by a more rapid switching of the higher luminance and the usual luminance. The changes in display luminance may be effected intermittently or continuously. Furthermore, instead of enhancing the display luminance, flashing may be performed and may be increased or decreased according to the seriousness of the condition. In other words, intermittent black displaying may be performed when a predetermined physical parameter is within the alarm range, and the flashing period may be varied in accordance with the degree of alarming. Furthermore, higher luminance displaying and black displaying may be alternately performed.

A change in display luminance can be effected by, for example, varying the luminance of the backlight 20. Specifically, the display luminance can be increased by increasing the luminance of the backlight 20. Alternatively, intermittent black displaying can be performed by zeroing the luminance of the backlight 20 (i.e., turning off the backlight 20) on an intermittent basis.

Moreover, a change in display luminance may be effected by varying a signal (driving signal) which is supplied by a driving circuit (not shown) to drive the liquid crystal panel 10. For example, the display luminance can be increased by supplying a signal corresponding to a higher gray scale level, and intermittent black displaying can be performed by intermittently supplying a signal corresponding to the lowest gray scale level.

In the case where the alarm is to be provided by effecting a change in displayed color, it is preferable to use a color which provides a high alarming effect, e.g., red (R) or yellow (i.e., a mixed color of R and G). A change in displayed color may be effected by, for example, varying the driving signal supplied from a driving circuit. It is also possible to use various colors to indicate the relative seriousness of the condition or degree of alarming, such as using yellow for a mild alarming condition, orange for a more serious alarming condition and red for the most serious alarming condition. It is also possible to combine the concept of increasing the flashing rate and changing the color to indicate the seriousness of the alarming condition such that, for example, the most serious condition is indicated by a flashing red light that is being intermittently displayed at the highest possible flashing rate.

By effecting a change in display luminance, it is possible to provide an effective alarm based on the temporal-spatial characteristics of human eyesight. On the other hand, by effecting a change in displayed color, it is possible to provide an effective alarm based on chromatic effects. Of course, an even more effective alarm can be given by effecting both a change in display luminance and a change in displayed color as mentioned above. In such a case, a change in display luminance and a change in displayed color may each be effected for the entire displaying region, or effected in a specific region (e.g., a region in which a physical parameter which has fallen into the alarm range being displayed). For example, in the case of providing an alarm concerning water temperature, the displayed color of a region in which water temperature is being displayed may be varied while also varying the luminance of the entire displaying region.

The selection as to which one of the physical parameters representing the status of an automotive vehicle should trigger an alarm, or what values are to be set for the alarm range, may be appropriately made depending on the purpose for which the vehicle is used, for example. From the standpoint of convenience, it would be preferable that such selections can be selectively made externally to the display device 100 (e.g., by the driver).

Figure 5A:
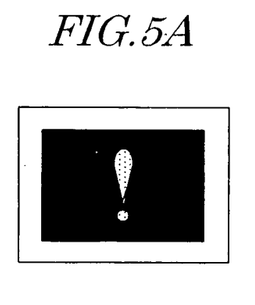
FIGS. 5A to 5C are diagrams each showing an exemplary indication which is made in a manner to resemble an indicator.
Figure 5B:
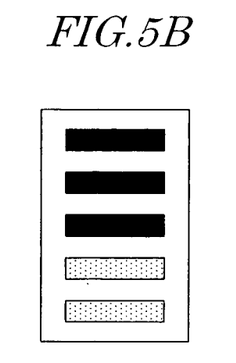
Figure 5C:
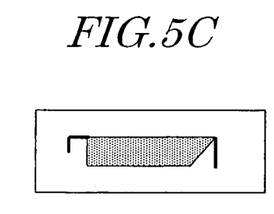

The display device 100 according to a preferred embodiment of the present invention has the following advantages over any techniques in which an alarm is provided by merely presenting an indication in a manner to resemble an indicator within the displaying region. FIGS. 5A to 5C each shows an exemplary indication which is made in a manner to resemble an indicator. FIG. 5A shows an indicator representing any indefinite alarm. FIG. 5B shows an indicator representing remaining fuel amount. FIG. 5C shows an indicator representing engine oil leakage. When an alarm is to be provided by displaying any of the indicators as shown in FIGS. 5A to 5C, naturally, the indicator would itself have to be displayed in a portion of the displaying region. On the other hand, since the display device 100 according to a preferred embodiment of the present invention provides an alarm via a change in display luminance and/or a change in displayed color, there is no need to additionally display any particular indicator for alarming. In other words, in accordance with the display device 100, an alarm function can be imparted to any portion of the displaying region which originally is unrelated to alarm indications (e.g., a portion in which velocity is to be displayed or the background region in which no information is to be displayed). Therefore, there is no particular need to secure within the displaying region any portion dedicated to alarm indications. Thus, it is possible to display various information in a variety of layouts within the displaying region. However, the above description does not preclude the display device 100 from displaying an indicator within the displaying region for design-oriented reasons or the like.

The display device 100 according to a preferred embodiment of the present invention also has an advantage in that an alarm can be provided in various forms as necessary. For example, a change in display luminance and/or a change in displayed color may be effected in a portion of the displaying region in which a physical parameter which has fallen into the alarm range is to be displayed, or any other portion (i.e., a portion in which the physical parameter which has fallen into the alarm range is NOT to be displayed), or in both such portions. In other words, a change in display luminance and/or a change in displayed color may be effected in only a portion of the displaying region, or over the entire displaying region. Thus, as necessary, the display device 100 is able to effect a change in display luminance and/or a change in displayed color in any region other than the region in which the physical parameter which has fallen into the alarm range is being displayed, thus making for a more enhanced alarming effect. Furthermore, the display device 100 may also provide an alarm concerning any physical parameter which is not even displayed within the displaying region.

Figure 6:
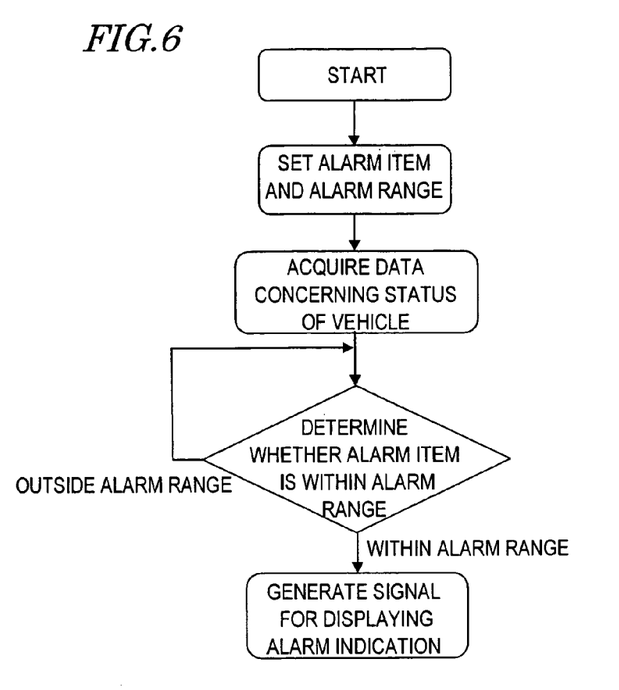
FIG. 6 is a flowchart showing an exemplary flow of control for an instrument panel incorporating the display device 100.
Figure 7:
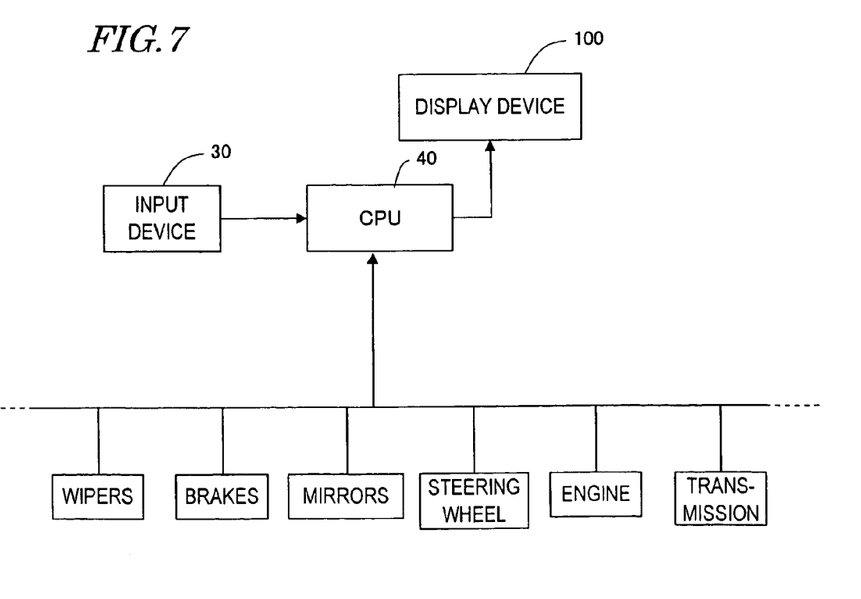
FIG. 7 is a block diagram showing a specific exemplary configuration for realizing the control illustrated in FIG. 6.

Next, with reference to FIGS. 6 and 7, an exemplary procedure for controlling an instrument panel incorporating the display device 100 will be described. FIG. 6 is a flowchart showing an exemplary flow of control for the instrument panel. FIG. 7 is a block diagram showing a specific exemplary configuration for realizing such control.

First, the selections as to which physical parameter should trigger an alarm, and in what range the alarm should go off are previously made via an input device 30 (alarm item/alarm range setting step). For example, the driver may set an alarm range for "vehicle velocity" to be "60 km/h or faster".

Next, data concerning the status of the automotive vehicle is acquired (data acquisition step). Specifically, from various devices mounted in the automotive vehicle, such as wipers, brakes, mirrors, a steering wheel, an engine, and a transmission, data concerning the status of each device is collected by the CPU 40. At this time, the collected data is sent to the display device 100 via the CPU 40, whereby display is performed.

Then, with respect to a physical parameter which has previously been set as the alarm item, the acquired data is compared against the alarm range, whereby the CPU 40 determines whether the physical parameter is within the predetermined alarm range (determination step). For example, in the case where an alarm range of "60 km/h or faster" has been set with respect to vehicle velocity, it is determined whether the current vehicle velocity is equal to or greater than 60 km/h.

If the CPU 40 determines that the alarm item is within the alarm range (e.g., the current vehicle velocity is equal to or greater than 60 km/h), the CPU 40 generates a signal for displaying an alarm indication, and the display device 100 provides an alarm based on this signal for displaying an alarm indication (alarm step). On the other hand, if it is determined that the alarm item falls outside the alarm range (e.g., the current vehicle velocity is less than 60 km/h), a comparison of newly acquired data against the alarm range is performed for further determination.

Now, with reference to FIG. 8, a manner in which an alarm may be given based on a signal for displaying an alarm indication will be described. The below example illustrates the case where the illuminator 20 includes a fluorescent lamp.

Firstly, based on the signal for displaying an alarm indication, input control for an inverter is performed. Specifically, the level (magnitude) of an applied voltage to the inverter may be adjusted, or the inverter may be controlled to be on or off. Through such input control, the level (magnitude) of the output voltage from the inverter can be determined, as a result of which the luminance of light emission from the fluorescent lamp can be controlled.

Figure 8:
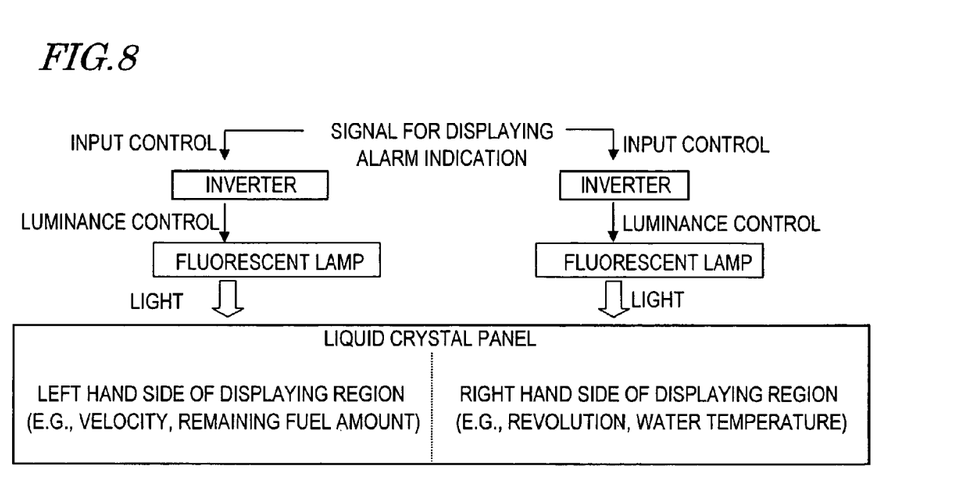
FIG. 8 is a block diagram for explaining how an alarm may be provided based on a signal for displaying an alarm indication.

As exemplified in FIG. 8, in the case where fluorescent lamps are provided in such a manner that independent luminance control can be performed for each of the right hand side and the left hand side of the displaying region, it would be possible to change the luminance of the entire displaying region, or change the luminance of only the right hand side (or the left hand side) of the displaying region. When the luminance of a portion of the displaying region in which the alarm item is to be displayed is changed, the driver's attention can be drawn to that portion. For example, in the case where velocity and remaining fuel amount are displayed on the left hand side of the displaying region, and the motor revolution and water temperature are displayed on the right hand side, the luminance of the left hand side of the displaying region may be changed to provide an alarm concerning velocity and/or remaining fuel amount, and the luminance of the right hand side of the displaying region may be changed to provide an alarm concerning revolution and/or water temperature, whereby the driver can easily recognize which item the alarm is directed to.

Although an example was illustrated above where the illuminator 20 includes a fluorescent lamp, it will be appreciated that any other type of illuminator may instead be used. In the case of an illuminator including an LED(s) (light-emitting diode), a circuit (LED driving circuit) for driving the LED(s) is used instead of an inverter. As a result, instead of input control for an inverter, input control for the LED driving circuit is performed. As illuminators including an LED(s), edge-light type illuminators in which an LED and a light guide plate are used in combination, and direct type illuminators incorporating a plurality of LEDs arranged in a matrix configuration (called an LED array) are known. In the case where a direct type illuminator is used, it is easy to subdivide the displaying region into small portions each of which permits independent luminance control, thus facilitating local changes in the luminance of the displaying region.

Although the present preferred embodiment illustrates an example of the present invention where the display device 100 is preferably a liquid crystal display device, any display device other than a liquid crystal display device may be used instead. For example, a self-emission type display device such as an organic or inorganic EL display device, or an SED (Surface-conduction Electron-emitter Display), which is recently drawing attention, may instead be used.

In the case where a liquid crystal display device is used, so-called "black insertion driving" may be performed in order to reduce afterimage problems and blurring of moving pictures. A "black insertion driving" technique is basically a driving method, used in a liquid crystal display device performing a hold-type display, where an impulse-type displaying similar to that performed in a CRT is performed. This technique may also be referred to as "pseudo impulse driving". By performing black insertion driving, the afterimage problems and blurring of moving pictures can be reduced.

Hereinafter, with reference to FIGS. 9A to 9C, black insertion driving will be described more specifically.

Figure 9A:
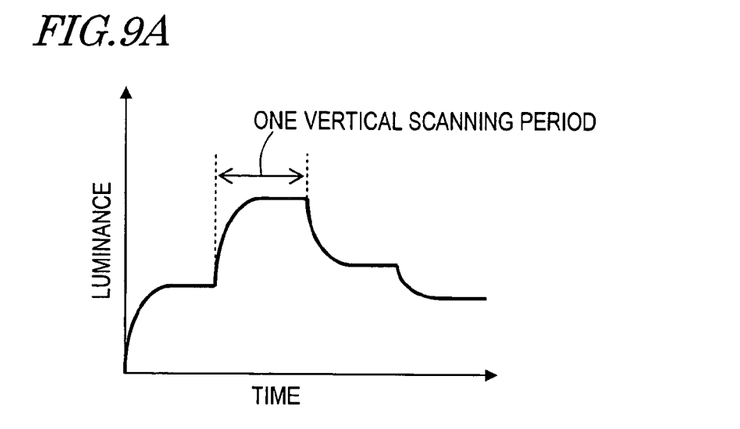
FIG. 9A is a graph showing changes over time of the luminance of a liquid crystal display device which performs hold-type display.
Figure 9B:
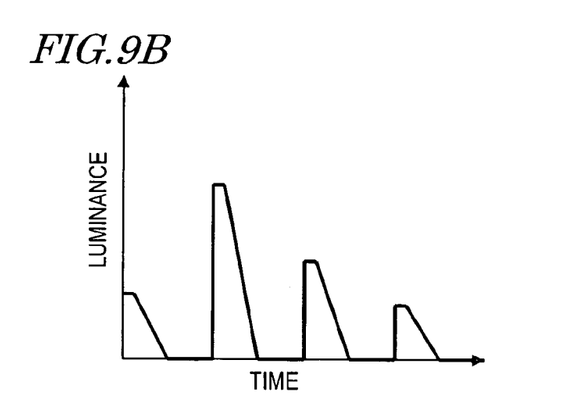
FIG. 9B is a graph showing changes over time of the luminance of a CRT which performs impulse-type display.

In liquid crystal display devices in general, as shown in FIG. 9A, hold-type display is performed. That is, the luminance corresponding to a data signal which is written in a given vertical scanning period is retained until new data signal is written in a next vertical scanning period. On the other hand, in CRTs, impulse-type display is performed as shown in FIG. 9B. That is, light emission occurs only during a portion of one vertical scanning period. Note that one vertical scanning period corresponds to one frame in the case of non-interlace driving, and corresponds to one field in the case of interlace driving (where one frame is divided into a plurality of fields).

In the case where black insertion driving is performed, a "black display signal (which corresponds to displaying black)" is to be supplied from the driving circuit to each pixel, during one vertical scanning period, at a point in time which is different from the point in time at which a data signal is supplied. Then, each pixel is controlled so as to retain the data signal for a predetermined portion of the duration of time corresponding to one vertical scanning period, and retain the black display signal for a predetermined portion of the rest of the vertical scanning period. As a result, as shown in FIG. 9C, pseudo impulse-type display can be performed, whereby the afterimage problems and blurring of moving pictures can be reduced.

The ratio between the duration of time for which the data signal is retained and the duration of time for which the black display signal is retained may be appropriately set in accordance with the type of information to be displayed or the like. From the standpoint of sufficiently reducing the afterimage problems and blurring of moving pictures, it is preferable that the duration of time for which the black display signal is retained is equal to or greater than ¼ of the duration of time corresponding to one vertical scanning period.

Figure 9C:
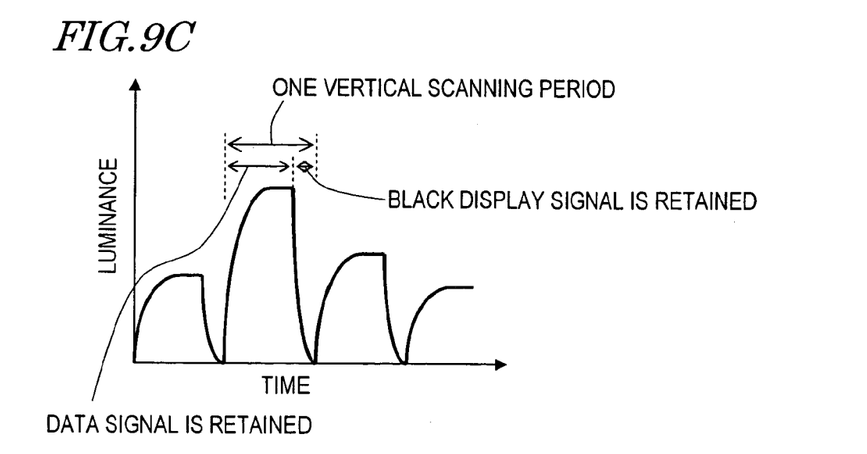
FIG. 9C is a graph showing changes over time of the luminance of a liquid crystal display device which operates under black insertion driving (pseudo impulse driving).

Although FIG. 9C illustrates an example where the luminance is lowered to a black displaying state within the period during which the black display signal is retained, it is not necessary that the luminance be lowered to a black displaying state within the period during which the black display signal is retained. If the amount of time for writing the black display signal (i.e., the amount of time for which the TFTs stay active during a write of the black display signal) is short, the response speed of the liquid crystal layer is slow. Alternatively, if the duration of time for which the black display signal is retained is short, the luminance may not be sufficiently lowered to attain a black displaying state in the strict sense. However, even in such cases, the effect of pseudo impulse driving can be obtained.

As a specific method of black insertion driving, any of a variety of known methods can be adopted. By using a method disclosed in Japanese Laid-Open Patent Publication No. 2001-60078 or Japanese Laid-Open Patent Publication No. 2001-296838, black insertion driving can be realized with a simple construction.

As disclosed in Japanese Laid-Open Patent Publication No. 2001-60078, a structure may be adopted which can generate, as a black display signal for realizing black insertion driving, a signal which is different from a "black display signal" as defined by an exact level of data signal (i.e., a signal corresponding to the lowest gray scale level). In this case, it is possible to apply a voltage which is higher (or lower) than the voltage corresponding to the lowest gray scale signal to the liquid crystal layer. Therefore, the response speed of the liquid crystal layer when a black display signal is written can be improved, such that the luminance can be promptly brought to a black displaying state within the duration of time for which the black display signal is retained. Thus, the effect of reducing the afterimage problems and blurring of moving pictures can be sufficiently obtained.

As described above, black insertion driving can contribute to an improved moving picture displaying quality. On the other hand, black insertion driving can also be applied to effect a change in display luminance. When black insertion driving is performed, a black display signal is retained for a predetermined portion of one vertical scanning period, thus lowering the display luminance than in usual driving. Therefore, by switching between usual driving and black insertion driving, changes in display luminance can be effected. In the alternative, the display luminance becomes lower as the duration of time for which the black display signal is retained within one vertical scanning period is increased, and becomes higher as the aforementioned duration is decreased. Therefore, while continuously performing black insertion driving, the ratio between the duration of time for which the data signal is retained and the duration of time for which the black display signal is retained may be varied to effect changes in display luminance.

As described above, the display device 100 according to various preferred embodiments of the present invention can be suitably used for an instrument panel of an automotive vehicle. As used herein, an "automotive vehicle" may be any vehicle or machine which is capable of self propulsion and used for passenger or article transportation or moving of objects, e.g., a car, a motorbike, a bus, a truck, a tractor, an airplane, a motorboat, a vehicle for civil engineering use, a train, or the like. It will be appreciated that "automotive vehicles" are not limited to only those which are provided with internal combustion engines such as gasoline engines, but also encompass those provided with electric motors or other types of propulsion mechanisms.

According to preferred embodiments of the present invention, a display device which is suitably used for an instrument panel to be mounted in an automotive vehicle is provided. The present invention can be used for a non-emission type display device such as a liquid crystal display device, or for a self-emission type display device such as an organic or inorganic EL display device or an SED.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This non-provisional application claims priority under 35 USC §119(a) of Japanese Patent Application No. 2004-125455 filed on Apr. 21, 2004 and Japanese Patent Application No. 2005-039434 filed on Feb. 16, 2005, the entire contents of which are hereby incorporated by reference.

What is claimed is:

1. A display device for an instrument panel to be mounted in an automotive vehicle, the display device being capable of displaying information concerning a status of the automotive vehicle, and, when a predetermined physical parameter among at least one physical parameter representing the status of the automotive vehicle is within a predetermined range, giving an alarm by effecting at least one of a change in display luminance and a change in displayed color; wherein
the display device is a liquid crystal display device including a liquid crystal panel having a pair of substrates and a liquid crystal layer provided between the pair of substrates; and
the display device includes a driving circuit arranged to supply signals to drive the liquid crystal panel, including a signal that changes display luminance or displayed color.

2. The display device of claim 1, wherein the predetermined physical parameter is a velocity of the automotive vehicle, a revolution of an engine, a remaining fuel amount, a remaining battery power, a water temperature, or a vehicular gap.

3. The display device of claim 1, wherein the change in display luminance is effected so that a display luminance when the predetermined physical parameter is within the predetermined range is at least temporarily higher than a display luminance when the predetermined physical parameter is outside the predetermined range.

4. The display device of claim 1, wherein the change in display luminance is effected intermittently when the predetermined physical parameter is within the predetermined range.

5. The display device of claim 4, wherein a rate of intermittent change in display luminance is increased or decreased to provide an indication of a degree of seriousness of an alarming condition indicated by the change in display luminance.

6. The display device of claim 1, wherein the change in display luminance is effected so that black is intermittently displayed when the predetermined physical parameter is within the predetermined range.

7. The display device of claim 6, wherein a rate of intermittent display of black is increased or decreased to provide an indication of a degree of seriousness of an alarming condition indicated by the intermittent display of black.

8. The display device of claim 1, wherein the at least one of the change in display luminance and the change in displayed color is effected in a portion of a displaying region.

9. The display device of claim 1, wherein the at least one of the change in display luminance and the change in displayed color is effected in the entirety of a displaying region.

10. The display device of claim 1, wherein the at least one of the change in display luminance and the change in displayed color is effected in a portion of a displaying region where the predetermined physical parameter is displayed.

11. The display device of claim 10, wherein the at least one of the change in display luminance and the change in displayed color is effected also in another portion of a displaying region where the predetermined physical parameter is not displayed.

12. The display device of claim 1, wherein the predetermined physical parameter is a physical parameter which is not displayed in a displaying region.

13. The display device of claim 1, wherein the change in displayed color is effected such that each particular color displayed provides an indication of a degree of seriousness of an alarming condition indicated by the change in displayed color.

14. The display device of claim 13, wherein the change in displayed color and the change in display luminance is effected in combination, and the change in display luminance is effected intermittently such that a rate of intermittent change in display luminance is increased or decreased to provide a further indication of the degree of seriousness of the alarming condition.

15. The display device of claim 1, further comprising an illuminator provided at a back side of the liquid crystal panel, the display device being capable of effecting the change in display luminance by changing a luminance of the illuminator.

16. An instrument panel comprising the display device of claim 1.

17. An automotive vehicle comprising the instrument panel of claim 16.

18. A display device for an instrument panel to be mounted in an automotive vehicle, the display device being capable of displaying information concerning a status of the automotive vehicle, and, when a predetermined physical parameter among at least one physical parameter representing the status of the automotive vehicle is within a predetermined range, giving an alarm by effecting at least one of a change in display luminance and a change in displayed color; wherein
the display device includes a driving circuit arranged to supply a signal for driving the liquid crystal panel having a plurality of pixels, wherein the driving circuit is capable of supplying within one vertical scanning period a black display signal corresponding to a black display state to each pixel of the liquid crystal panel, the black display signal being supplied with a timing different from a timing for supplying a data signal, so that each pixel of the liquid crystal panel retains the data signal for a predetermined first period, and retains the black display signal for a predetermined second period, the first and second periods belonging to one vertical scanning period.

19. A display device for an instrument panel to be mounted in an automotive vehicle, the display device being capable of displaying information concerning a status of the automotive vehicle, and, when a predetermined physical parameter among at least one physical parameter representing the status of the automotive vehicle is within a predetermined range, giving an alarm by effecting at least one of a change in display luminance and a change in displayed color; wherein the display device includes a driving circuit arranged to supply a signal for driving the liquid crystal panel having a plurality of pixels, wherein the driving circuit is capable of supplying within one vertical scanning period a black display signal corresponding to a black display state to each pixel of the liquid crystal panel, the black display signal being supplied with a timing different from a timing for supplying a data signal, so that each pixel of the liquid crystal panel retains the data signal for a predetermined first period, and retains the black display signal for a predetermined second period, the first and second periods belonging to one vertical scanning period; and the display device is capable of effecting the change in display luminance by varying a ratio between the first period of retaining the data signal and the second period of retaining the black display signal.

* * * * *